US008279217B2

(12) United States Patent
Liu et al.

(10) Patent No.: US 8,279,217 B2
(45) Date of Patent: Oct. 2, 2012

(54) LIQUID CRYSTAL DISPLAY PANEL AND DRIVING METHOD THEREOF

(75) Inventors: Sheng-Chao Liu, Hsinchu County (TW); Tsang-Hong Wang, Chiayi (TW); Chung-Lung Li, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 446 days.

(21) Appl. No.: 12/560,431

(22) Filed: Sep. 16, 2009

(65) Prior Publication Data

US 2010/0295843 A1 Nov. 25, 2010

(30) Foreign Application Priority Data

May 25, 2009 (TW) ............................... 98117342 A

(51) Int. Cl.
*G06F 3/038* (2006.01)

(52) U.S. Cl. .......................................... 345/214; 345/87

(58) Field of Classification Search ........................ None
See application file for complete search history.

(56) References Cited

U.S. PATENT DOCUMENTS

| | | | | |
|---|---|---|---|---|
| 5,621,558 | A | 4/1997 | Shimada et al. | |
| 6,075,507 | A * | 6/2000 | Miyahara et al. | 345/89 |
| 7,106,406 | B2 | 9/2006 | Lee et al. | |
| 7,432,995 | B2 * | 10/2008 | Lee et al. | 349/48 |
| 7,567,228 | B1 * | 7/2009 | Wen et al. | 345/87 |
| 7,755,591 | B2 * | 7/2010 | Yeh | 345/100 |
| 7,764,262 | B2 * | 7/2010 | Lee | 345/99 |
| 2006/0066789 | A1 | 3/2006 | Toyooka | |
| 2008/0266225 | A1 * | 10/2008 | Kim | 345/88 |
| 2009/0262061 | A1 * | 10/2009 | Chung et al. | 345/100 |
| 2010/0033470 | A1 * | 2/2010 | Lee et al. | 345/212 |

* cited by examiner

*Primary Examiner* — Jason Olson
(74) *Attorney, Agent, or Firm* — Jianq Chyun IP Office

(57) ABSTRACT

A liquid crystal display panel includes a sub-pixel array, a plurality of scan lines, and a plurality of data lines. The sub-pixel array has a plurality of sub-pixels arranged in array. Any two neighboring scan lines of the scan lines and a row of the sub-pixels disposed between the two neighboring scan liens are electrically connected. The sub-pixels arranged in odd rows are electrically connected to the odd-numbered data lines, and the sub-pixels arranged in even rows are electrically connected to the even-numbered data lines. Thus, the liquid crystal display panel is able to reduce mura phenomenon through the above-mentioned layout. A driving method of the above-mentioned liquid crystal display panel is also provided.

18 Claims, 15 Drawing Sheets

LIQUID CRYSTAL DISPLAY PANEL AND DRIVING METHOD THEREOF

CROSS-REFERENCE TO RELATED APPLICATION

This application claims the priority benefit of Taiwan application serial no. 98117342, filed on May 25, 2009. The entirety of the above-mentioned patent application is hereby incorporated by reference herein and made a part of specification.

BACKGROUND OF THE INVENTION

1. Field of the Invention

The present application generally relates to a display panel and a driving method thereof. More particularly, the present application relates to a liquid crystal display (LCD) panel and a driving method thereof.

2. Description of Related Art

In order to meet the requirements of high speed, high efficiency, light weight, and compactness for modern products, electronic parts have been vigorously developed towards miniaturization. Various mobile electronic devices have become the mainstream, e.g. notebook computers, cell phones, electronic dictionaries, personal digital assistants (PDAs), web pads, tablet personal computers (PCs), and so forth. To satisfy demands for miniaturized image display panels of mobile electronic devices, LCD panels having superior characteristics, such as favorable space utilization, high resolution, low power consumption, and no radiation have been extensively applied nowadays.

In general, an LCD panel is mainly formed by a plurality of scan lines, a plurality of data lines, and a plurality of pixels respectively driven by corresponding scan lines and data lines. Recently, to popularize the LCD panels and to comply with an energy-saving trend, manufacturers are eager to reduce both the costs and power consumption. Accordingly, a method has been proposed to reduce the number of data driving chips through the layout of a pixel array.

FIG. 1A is a schematic view illustrating a conventional LCD panel with a tri-gate driving structure. As indicated in FIG. 1A, the LCD panel 100 has a plurality of pixel units U arranged in array. Each of the pixel units U includes sub-pixels $P_R$, $P_G$, and $P_B$ sequentially arranged along a column direction. The sub-pixels $P_R$, $P_G$, and $P_B$ are electrically connected to corresponding scan lines G and corresponding data lines D through corresponding active devices, respectively. In FIG. 1A, some of the sub-pixels in two columns of pixels P share the same data line D for transmitting corresponding data signals. Under said framework, the number of scan lines G increases, while the number of data lines D decreases. That is to say, the number of data driving chips 110 which are bonded to the LCD panel 100 can be reduced in an effective manner. Since the data driving chips require high manufacturing costs, and therefore the decrease in the number of data driving chips 110 is conducive to cost reduction. On the other hand, signals processed by the data driving chips 110 are rather complicated and power-consuming, and therefore power consumed by the LCD panel 100 can be saved to a better degree when less data driving chips 110 are used.

Nonetheless, with the product demands for high resolution, turn-on time of each scan line is reduced. When an image of alternate black and white patterns, such as images of "11111111" or "dddddddd", is displayed on the LCD panel. Thereby, response time of a common voltage Vcom corresponding to the sub-pixels in each row is insufficient, which leads to a crosstalk effect in the neighboring sub-pixels and mura phenomenon on the LCD panel.

FIG. 1B is a schematic view illustrating the LCD panel depicted in FIG. 1A in a driving state and in a display state. As indicated in FIGS. 1A and 1B, through applying a dot-inversion driving method, the sub-pixels $P_R$, $P_G$, and $P_B$ in the LCD panel are driven to display an image of alternate black and white patterns. Since the active devices electrically connected to the same data line are alternately arranged at two sides of the data line along the column direction, the sub-pixels into which data signals are written through the same data line are arranged in a zigzag pattern. In FIG. 1B, an exemplary signal with a negative polarity is transmitted through the data line D(4) and input into the sub-pixels in two columns C3 and C4. The sub-pixels of the two columns C3 and C4 electrically connected to the data line D(4) and alternately arranged at two sides of the data line D(4) show a negative polarity.

FIG. 1C is a schematic view illustrating waveforms of driving some of the data lines depicted in FIG. 1B. In FIG. 1C, the LCD panel displaying normally white images is taken for example. As shown in FIGS. 1B and 1C, signals transmitted through the data lines D(4) and D(5) have a negative polarity and a positive polarity, respectively. Besides, according to time sequence, data voltages in an order of black, white, black, white, and black are respectively input into the sub-pixels in rows R1, R2, R3, R4, and R5 through the data line D(4) used for transmitting the signals with the negative polarity; data voltages in an order of white, black, white, black, and white are input into the sub-pixels in the rows R1, R2, R3, R4, and R5 through the data line D(5) used for transmitting the signals with the positive polarity.

With reference to FIG. 1C, in general, the common electrode is coupled by the data lines, and the voltage of the common electrode is varied by a coupling effect arisen from a variation in data polarity with time sequence. Due to the fact that the voltage coupling effect arisen from different polarity signals transmitted in the data line D(4) with time sequence is the same as the voltage coupling effect arisen from the data lines D(5) with the same time sequence, the total coupling of the common electrode cannot be eliminated. Thereby, the common voltage Vcom is shifted.

FIG. 1D is a schematic view illustrating mura phenomenon occurring in a conventional LCD panel. With reference to FIG. 1D, alternate black and white patterns are usually displayed on the LCD panel by the sub-pixels in a plurality of rows. Therefore, when the alternate black and white patterns are displayed on the LCD panel by the sub-pixels (as shown in the upper part of FIG. 1D), said common voltage shift likely results in mura phenomenon at two sides of the sub-pixels (as shown in the lower part of FIG. 1D). Particularly, when gray or monochrome patterns serve as backgrounds, the mura phenomenon becomes more conspicuous.

SUMMARY OF THE INVENTION

The present application is directed to an LCD panel capable of reducing power consumption and resolving an issue of mura phenomenon.

The present application is further directed to a driving method for minimizing mura phenomenon caused by a crosstalk effect.

In the present application, an LCD panel including a sub-pixel array, a plurality of scan lines, and a plurality of data lines is provided. The sub-pixel array includes a plurality of sub-pixels arranged in array, and any two neighboring scan lines of the scan lines and a row of the sub-pixels disposed between the two neighboring scan lines are electrically connected. The sub-pixels arranged in odd rows are electrically connected to odd-numbered data lines, and the sub-pixels arranged in even rows are electrically connected to even-numbered data lines.

According to an exemplary embodiment of the present invention, each of the sub-pixels includes an active device and a pixel electrode. The active device is electrically connected to one of the scan lines and one of the data lines, and the pixel electrode is electrically connected to the active device.

According to an exemplary embodiment of the present invention, in the same row of the sub-pixels, the sub-pixels arranged in even columns are connected to one of the scan lines, and the sub-pixels arranged in odd columns are connected to another one of the scan lines.

According to an exemplary embodiment of the present invention, two neighboring sub-pixels of the sub-pixels in the same row are, for example, connected to the same data line.

According to an exemplary embodiment of the present invention, the sub-pixels include a plurality of first primary color sub-pixels arranged in the same row, a plurality of second primary color sub-pixels arranged in the same row, and a plurality of third primary color sub-pixels arranged in the same row. The first, the second, and the third primary color sub-pixels in each column are alternately arranged in sequence, for example. Besides, in the same column of the sub-pixels, the neighboring first, second, and third primary color sub-pixels together form a pixel unit, for example.

According to an exemplary embodiment of the present invention, the sub-pixels include a plurality of first primary color sub-pixels arranged in the same column, a plurality of second primary color sub-pixels arranged in the same column, and a plurality of third primary color sub-pixels arranged in the same column. The first, the second, and the third primary color sub-pixels in each row are alternately arranged in sequence, for example. Besides, in the same row of the sub-pixels, the neighboring first, second, and third primary color sub-pixels together form a pixel unit, for example. Additionally, the first primary color sub-pixels of the sub-pixels can be arranged in a first column, a fourth column, . . . , and a (3m+1)th column; the second primary color sub-pixels of the sub-pixels can be arranged in a second column, a fifth column, . . . , and a (3m+2)th column; the third primary color sub-pixels of the sub-pixels can be arranged in a third column, a sixth column, . . . , and a (3m+2)th column. Here, m represents a natural number.

According to an exemplary embodiment of the present invention, the LCD panel further includes a plurality of dummy sub-pixels disposed at two sides of the sub-pixels and electrically connected to the outermost two data lines.

According to an exemplary embodiment of the present invention, the outermost two data lines can be electrically connected to each other.

According to an exemplary embodiment of the present invention, the LCD panel further includes a common electrode, wherein polarities of the neighboring sub-pixels with respect to the common electrode are opposite, and the voltage coupling effect arisen from the neighboring sub-pixels can be eliminated.

In the present invention, a driving method for driving the aforesaid LCD panel is further provided. The driving method includes inputting a signal with a first polarity to the odd-numbered data lines and inputting a signal with a second polarity to the even-numbered data lines.

According to an exemplary embodiment of the present invention, a signal with a positive polarity is inputted to the odd-numbered data lines, and a signal with a negative polarity is input to the even-numbered data lines, so as to drive the sub-pixel array through applying a column-inversion driving method.

According to an exemplary embodiment of the present invention, a signal with a first inverted polarity is inputted to the odd-numbered data lines, and a signal with a second inverted polarity is input to the even-numbered data lines, so as to drive the sub-pixel array through applying a dot-inversion driving method, wherein the first inverted polarity is an inverted polarity signal, i.e. positive polarity, and the second inverted polarity opposite to the first inverted polarity is a reversely inverted polarity signal, i.e. negative polarity.

In the present application, an LCD panel including a sub-pixel array, a plurality of scan lines, and a plurality of data lines is further provided. The sub-pixel array has a plurality of sub-pixels arranged in array. Two neighboring scan lines of the scan lines are electrically connected to a row of the sub-pixels disposed between the two neighboring scan lines. The data lines are divided into a first group and a second group. Each of the data lines of the first group and each of the data lines of the second group are alternately arranged. Here, the sub-pixels arranged in odd rows are electrically connected to the data lines of the first group, and the sub-pixels arranged in even rows are electrically connected to the data lines of the second group.

According to an exemplary embodiment of the present invention, the data lines of the first group are odd-numbered, for example, and the data lines of the second group are even-numbered, for example.

According to an exemplary embodiment of the present invention, the data lines of the first group are even-numbered, for example, and the data lines of the second group are odd-numbered, for example.

Based on the above, the proper layout of the sub-pixel array, the scan lines, and the data lines not only can decrease the required number of data driving chips but also can reduce manufacturing costs and power consumption. Moreover, when the LCD panel displays images, the coupling of the common electrode can be eliminated because the voltage coupling effects arisen from variation in data polarity of the data lines with time sequence are neutralized. As such, mura phenomenon of the displayed images can be minimized, and display quality can be improved.

In order to make the aforementioned and other features and advantages of the present invention more comprehensible, several embodiments accompanying figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1A:
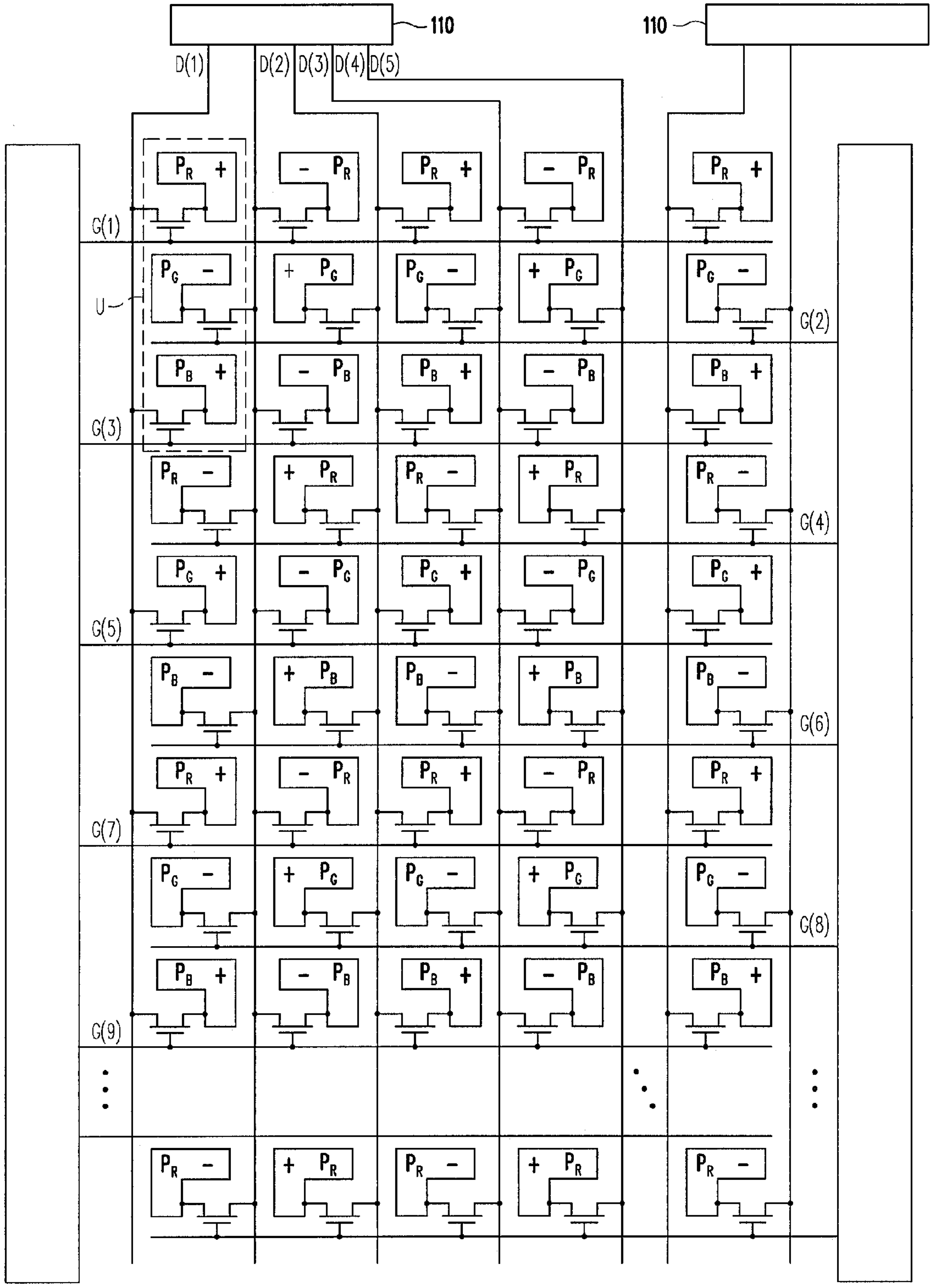
FIG. 1A (RELATED ART)
FIG. 1A is a schematic view of a conventional LCD panel.
Figure 1B:
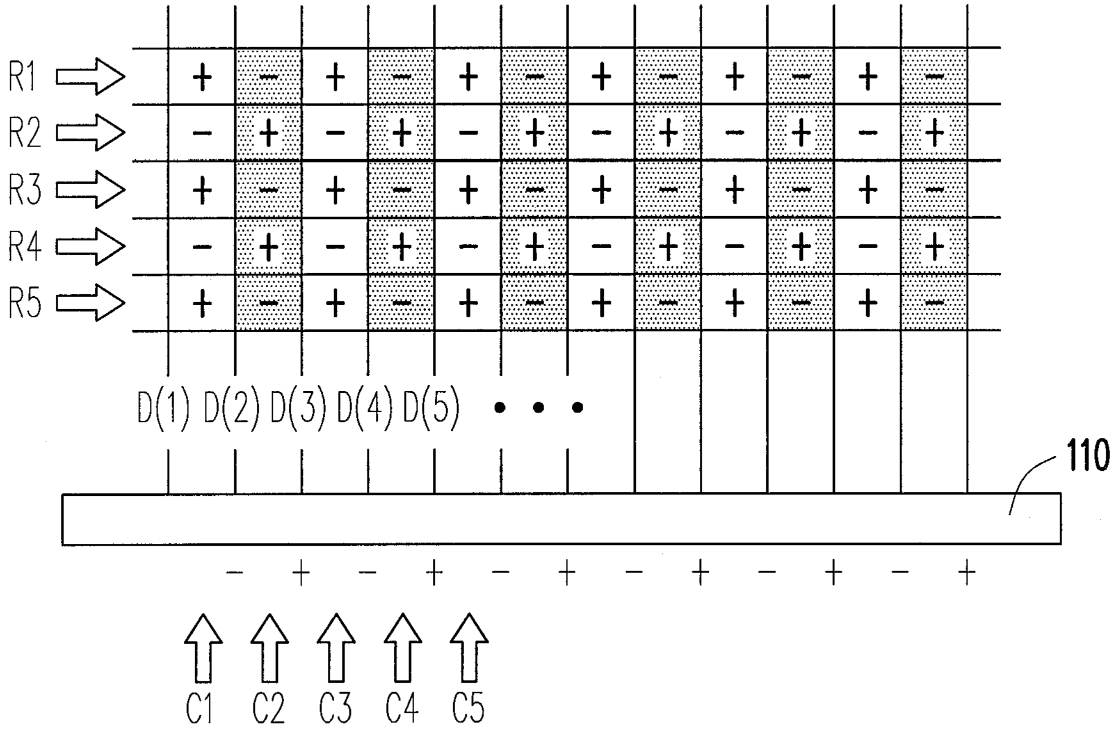
FIG. 1B (RELATED ART)
FIG. 1B is a schematic view illustrating the LCD panel depicted in FIG. 1A in a driving state and in a display state.
Figure 1C:
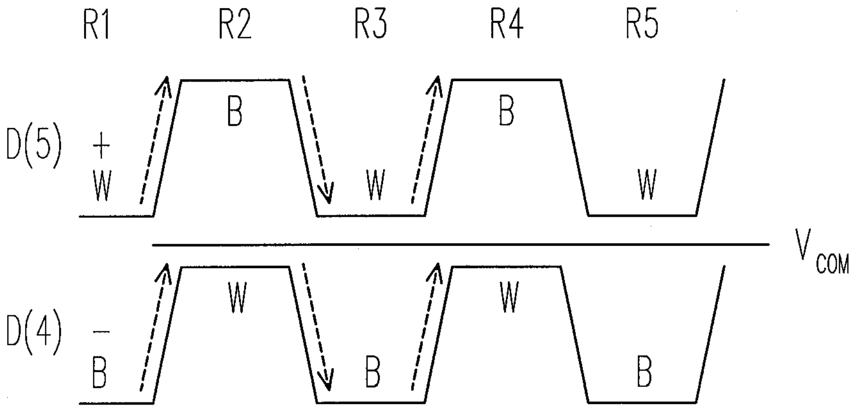
FIG. 1C (RELATED ART)
FIG. 1C is a schematic view illustrating waveforms of driving some of the data lines depicted in FIG. 1B.
Figure 1D:
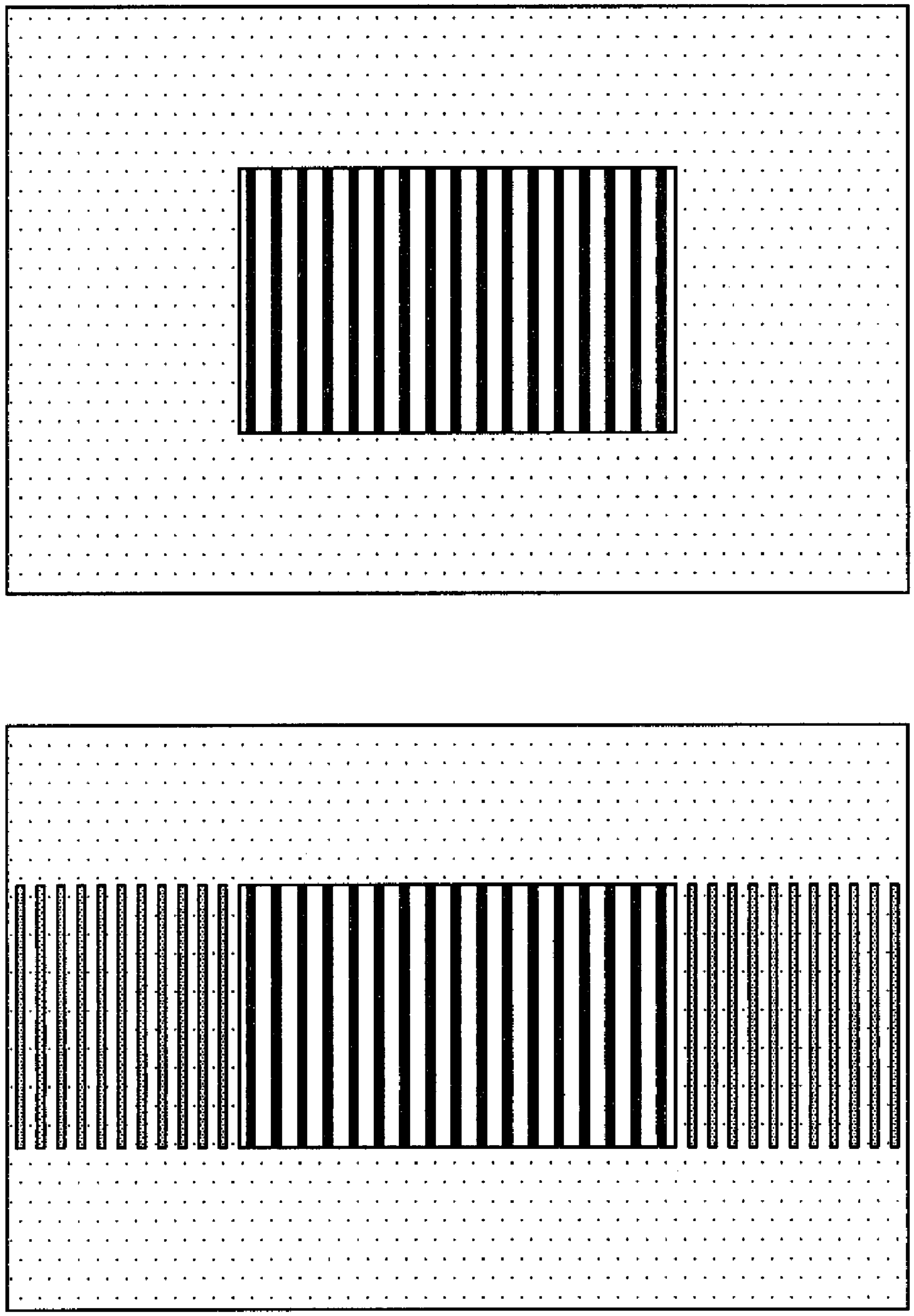
FIG. 1D (RELATED ART)
FIG. 1D is a schematic view illustrating mura phenomenon in a conventional LCD panel.
Figure 2:
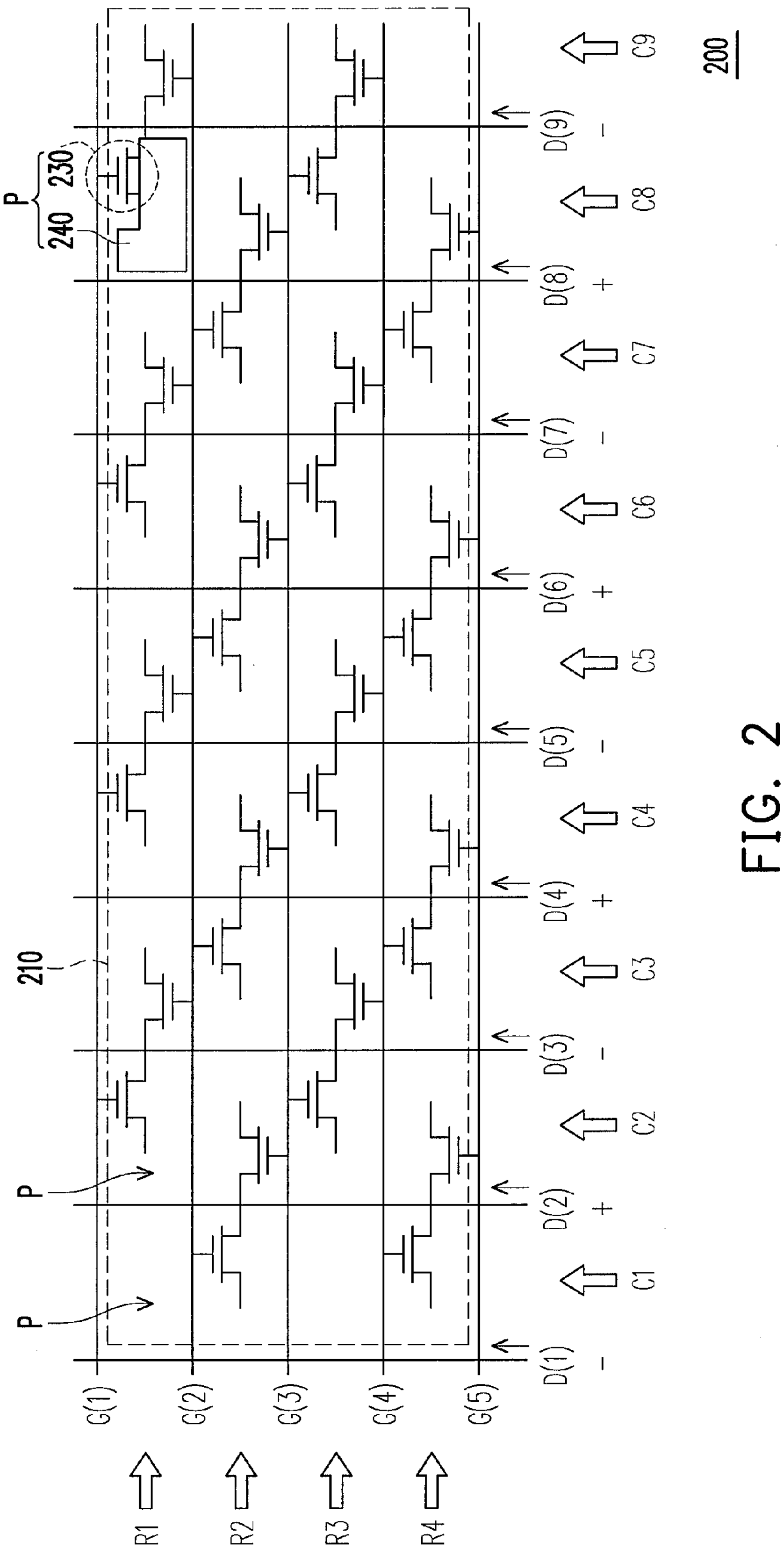
FIG. 2 is a schematic view illustrating an LCD panel layout according to an exemplary embodiment of the present invention.

FIG. 2 is a schematic view illustrating an LCD panel layout according to an exemplary embodiment of the present invention. As indicated in FIG. 2, the LCD panel 200 includes a sub-pixel array 210, a plurality of scan lines G, e.g. scan lines G(1)~G(5), and a plurality of data lines D, e.g. data lines D(1)~D(9). Any two neighboring scan lines of the scan lines G(1)~G(5) and a row of sub-pixels P disposed between the two neighboring scan lines are electrically connected. For instance, the sub-pixels P in the row R2 are located between the neighboring scan lines G(2) and G(3) and electrically connected thereto. Besides, the data lines D(1)~D(9) can be divided into a first group and a second group, wherein the first group is odd-numbered data lines, and the second group is even-numbered data lines. Each of the data lines D of the first group and each of the data lines D of the second group are alternately arranged. The sub-pixels P arranged in odd rows are electrically connected to the data lines D of the first group, and the sub-pixels P arranged in even rows are electrically connected to the data lines D of the second group. Namely, in the present embodiment, the sub-pixels P arranged in the odd rows are electrically connected to the odd-numbered data lines D, and the sub-pixels P arranged in the even rows are electrically connected to the even-numbered data lines D. Certainly, the sub-pixels P arranged in the odd rows are likely to be electrically connected to the even-numbered data lines D, and the sub-pixels P arranged in the even rows are likely to be electrically connected to the odd-numbered data lines D, which should not be construed as limitations to the present invention.

As indicated in FIG. 2, the sub-pixel array 210 includes a plurality of sub-pixels P arranged in array, and each of the sub-pixels P is mainly composed of an active device 230 and a pixel electrode 240. The active device 230 is electrically connected to one of the scan lines G and one of the data lines D, for example. The pixel electrode 240 is electrically connected to the active device 230. To facilitate explanations, only some of the sub-pixels P of the LCD panel 200 and the main components of the sub-pixels P in row R1 and column C8 are depicted in FIG. 2.

Specifically, with reference to FIG. 2, in the same row of the sub-pixel P, the sub-pixels P arranged in even columns are connected to one of the scan lines G, and the sub-pixels P arranged in odd columns are connected to another one of the scan lines G. According to the present embodiment, in the sub-pixels P in the row R2, the sub-pixels P arranged in columns C2, C4, and C6 are connected to the scan line G(3), and the sub-pixels P arranged in columns C1, C3, and C5 are connected to the scan line G(2). As shown in FIG. 2, in the same row of the sub-pixels P, two neighboring sub-pixels P are together connected to the same data line D, for example. That is to say, through the above-mentioned layout, the sub-pixels P in two columns at respective sides of the same data line D together share the data line D. By way of time sequence control, data voltages (or signals) are respectively input to the sub-pixels with corresponding polarities, so as to achieve line inversion. As such, variations in polarities of the data lines can be reduced through said layout, and power consumption of a data driving chip can be further decreased to save energy and costs.

Figure 3:
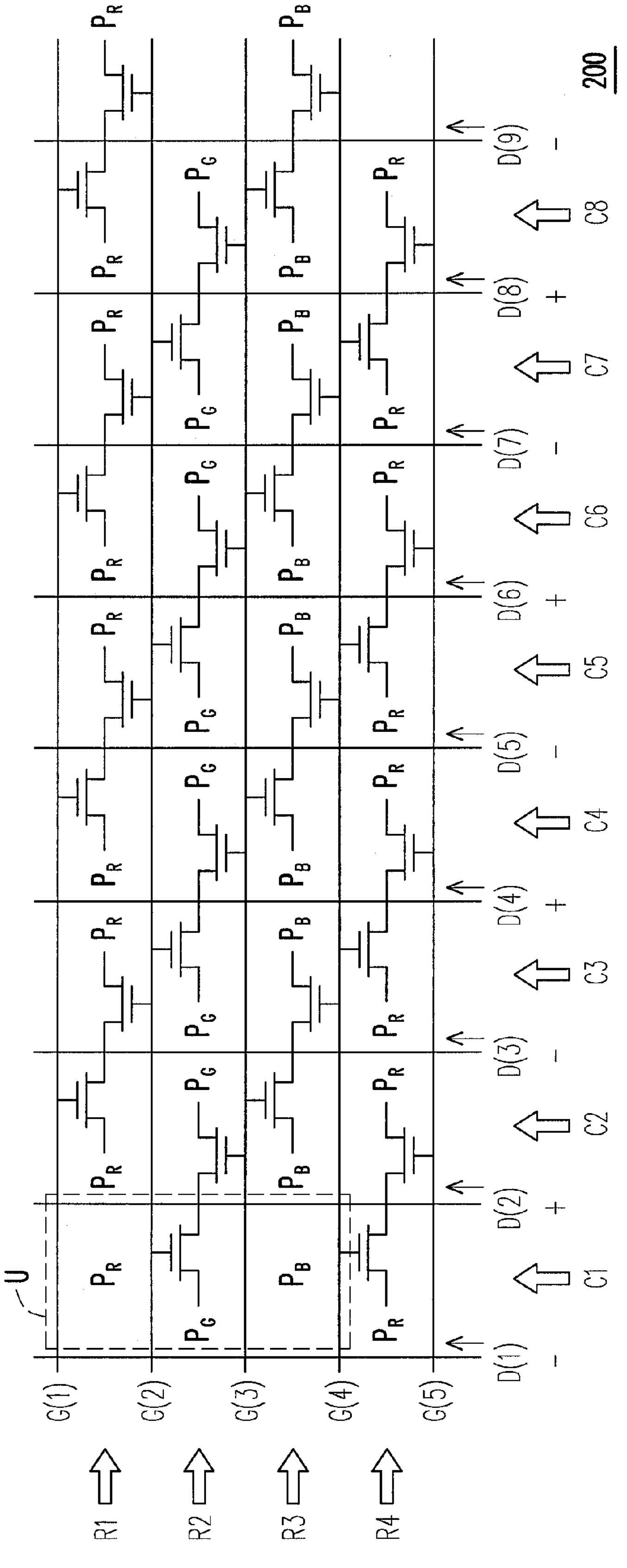
FIG. 3 is a schematic diagram of an LCD panel layout according to an exemplary embodiment of the present invention.

FIG. 3 is a schematic diagram of an LCD panel layout according to an exemplary embodiment of the present invention. Referring to FIG. 3, in the present embodiment, pixels of the LCD panel 200 include a set of sub-pixels P. Practically, to accomplish a full-color display effect, a white light beam obtained by mixing other color light beams is often displayed by each of the sub-pixels P in the set of sub-pixels P. To be more specific, in the present embodiment, the sub-pixels P include a plurality of first primary color sub-pixels $P_R$ which are arranged in the same row and display a red color, a plurality of second primary color sub-pixels $P_G$ which are arranged in the same row and display a green color, and a plurality of third primary color sub-pixels $P_B$ which are arranged in the same row and display a blue color. The first primary color sub-pixels $P_R$, the second primary color sub-pixels $P_G$, and the third primary color sub-pixels $P_R$ in each column are arranged in sequence, for example. It is for sure that the color displayed by each of the pixels P in the set of sub-pixels P can be interchanged, or other combination of colors can be shown, such as a trichromatic color combination of yellow, magenta, and cyon. Note that the present application does not pose limitations on the color displayed by each of the pixels P.

In FIG. 3, a tri-gate driving structure is taken for example. In the same column of the sub-pixels P, the neighboring first, second, and third primary color sub-pixels $P_R$, $P_G$, and $P_B$ together form a pixel unit U, for example.

Figure 4A:
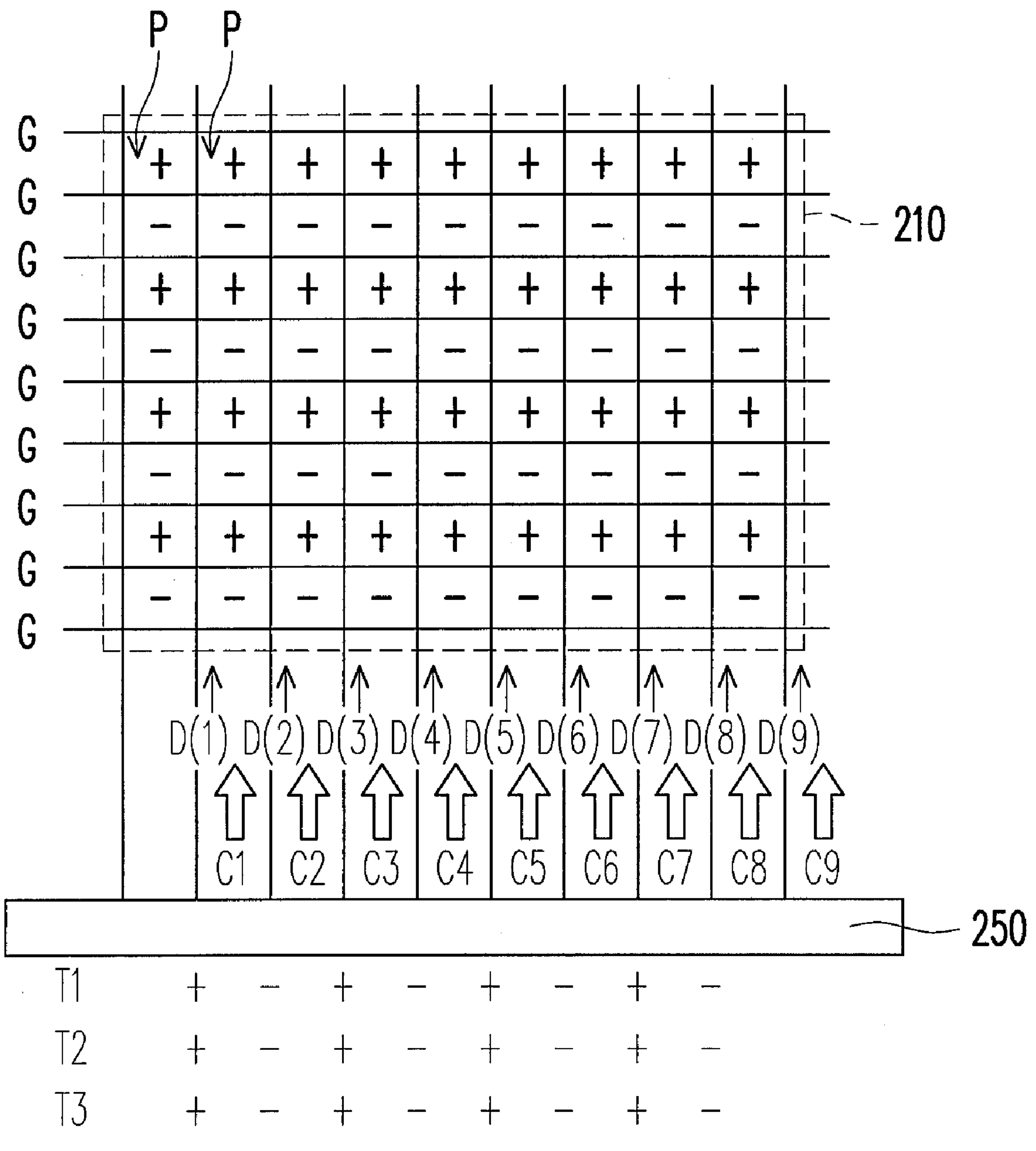
FIG. 4A is a schematic view illustrating a driving method and a driving state of an LCD panel according to an exemplary embodiment of the present invention.

FIG. 4A is a schematic view illustrating a driving method and a driving state of an LCD panel according to an exemplary embodiment of the present invention. To facilitate explanations, symbols "+" and "−" respectively denote relative polarities of voltage levels in FIG. 4. For instance, the symbols "+" and "−" respectively represent positive and negative polarities, wherein the positive polarities which can be defined as the voltages of the sub-pixels P or the data lines D are greater than the voltage of the common electrode, and the negative polarities which can be defined as the voltages of the sub-pixels P or the data lines D are smaller than the voltage of the common electrode. Accordingly, the symbols "+" and "−" are used to determine whether data voltages transmitted through each of the data lines D or each of the sub-pixels P have a positive polarity or a negative polarity. Referring to FIG. 4A, practically, data voltages (or signals) are inputted from a data driving chip 250 into the corresponding sub-pixels P through each of the data lines D, e.g. the data lines D(1)~D(9), such that each of the sub-pixels P is allowed to achieve a predetermined display effect. The aforesaid driving method includes inputting a signal with a first polarity (e.g. the positive polarity "+") into the odd-numbered data lines D and inputting a signal with a second polarity (e.g. the negative polarity "−") into the even-numbered data lines D.

As indicated in FIG. 4A, when the scan lines G are sequentially turned on from top to bottom, each of the data lines D sequentially supplies different data voltages (or signals) to be inputted into the corresponding sub-pixels P. The data line D(1) is taken for example. The data voltage provided by the data line D(1) has a positive polarity at a first timing T1, a second timing T2, and a third timing T3. Namely, in the frame time set forth in the present embodiment, the signal with the positive polarity is inputted into the odd-numbered data lines D, and the signal with the negative polarity is inputted into the even-numbered data lines D. Thereby, the sub-pixel array 210 can be driven by applying a column-inversion driving method as shown in FIG. 4A. The detailed driving mechanism is provided hereinafter.

Figure 4B:
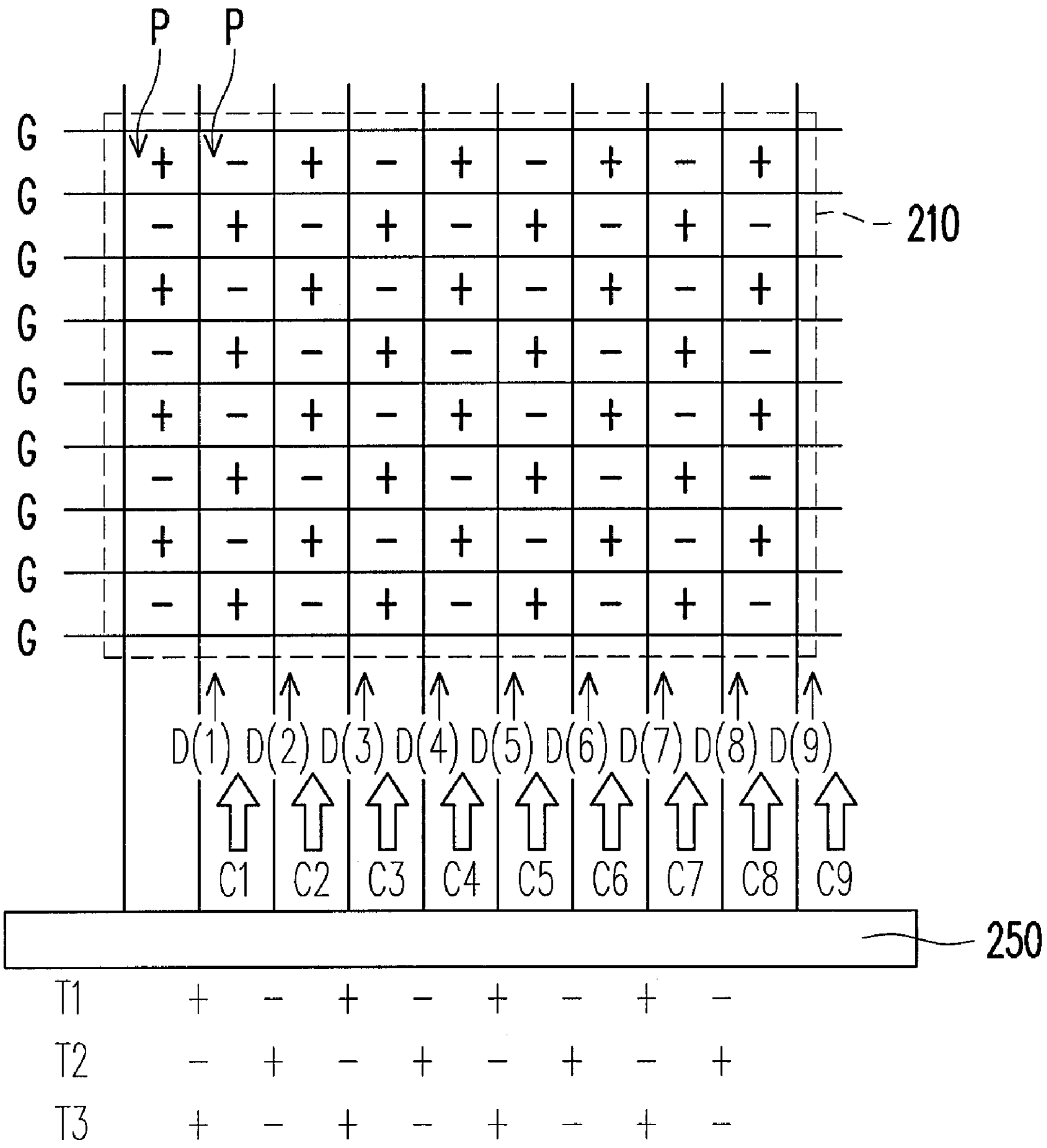
FIG. 4B is a schematic view illustrating a driving method and a driving state of an LCD panel 200 according to another exemplary embodiment of the present invention.

FIG. 4B is a schematic view illustrating a driving method and a driving state of an LCD panel according to an exemplary embodiment of the present invention. In FIGS. 4A and 4B, identical elements are indicated by the same reference numbers, and the descriptions thereof are not repeated hereinafter. According to the present embodiment, the driving method includes inputting a signal with a first polarity into the odd-numbered data lines D and inputting a signal with a second polarity into the even-numbered data lines D. As indicated in FIG. 4B, when the scan lines G are sequentially turned on from top to bottom, each of the data lines D sequentially supplies different data voltages (or signals) to be inputted into the corresponding sub-pixels P through the data driving chip 250. The data line D(1) is taken for example. The data voltage provided by the data line D(1) has a positive polarity at a first timing T1, a negative polarity at a second timing T2, and a positive polarity at a third timing T3. Namely, in the present embodiment, a signal with a first inverted polarity is inputted into the odd-numbered data lines D, and a signal with a second inverted polarity is inputted into the even-numbered data lines D. Thereby, the sub-pixel array 210 can be driven by applying a dot-inversion driving method.

Note that in the LCD panel of the present invention, the sub-pixels P in the sub-pixel array 210 and the corresponding scan lines G and data lines D are appropriately arranged. Accordingly, when the sub-pixel array 210 is driven by applying the column-inversion driving method or the dot-inversion driving method to display alternate black and white images on the LCD panel 200, voltage coupling effects arisen from different polarity signals transmitted in data lines with time sequence are opposite. Thereby, the total coupling of the common electrode can be eliminated, and no crosstalk effect is generated. In other words, the LCD panel of the present invention is capable of resolving the issue of mura phenomenon in the conventional LCD panel and reducing power consumption and costs. As such, consumers can be supplied with the LCD panel characterized by favorable display quality and the reduced costs and power consumption.

The aforesaid column-inversion driving method for driving the LCD panel 200 depicted in FIG. 2 is described hereinafter to explain that the coupling of the common electrode is eliminated because of voltage coupling effects arisen from the data lines D in time sequence when the LCD panel 200 displays alternate black and white images. Note that the following embodiment should not be construed as a limitation to the present invention.

Figure 5A:
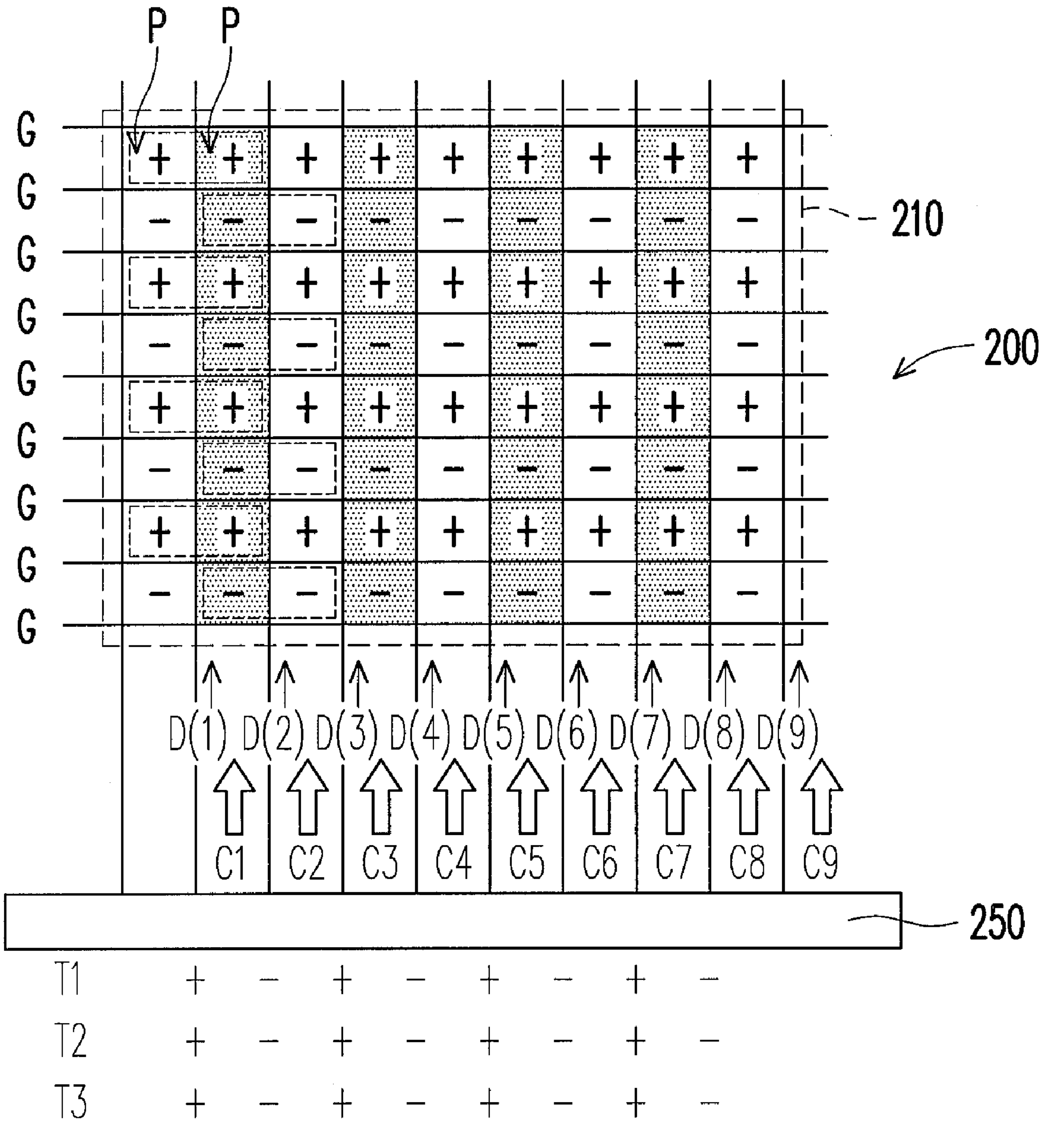
FIG. 5A is a schematic view illustrating a signal state of an LCD panel according to an exemplary embodiment of the present invention, wherein the LCD panel displays alternate black and white patterns through applying a column-inversion driving method.
Figure 5B:
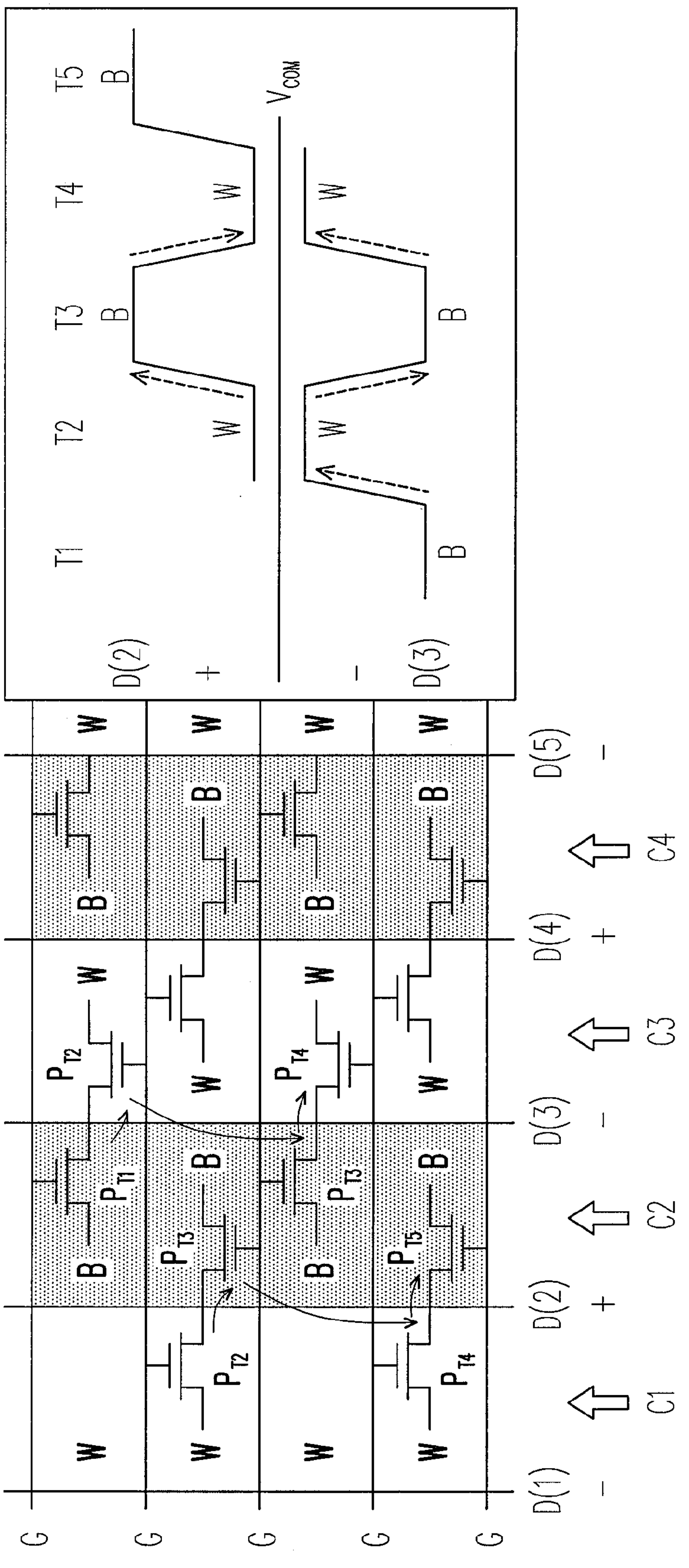
FIG. 5B is a view partially illustrating the signal state depicted in FIG. 5A and schematically illustrating driving waveforms of data lines.

FIG. 5A is a schematic view illustrating a signal state of an LCD panel according to an exemplary embodiment of the present invention, wherein the LCD panel displays alternate black and white patterns through applying a column-inversion driving method. To facilitate explanations, symbols "+" and "−" respectively denote relative polarities of voltage levels in FIG. 5A for determining whether data voltages or each of the sub-pixels P has a positive polarity or a negative polarity. FIG. 5B is a view partially illustrating the signal state depicted in FIG. 5A and schematically illustrating driving waveforms of data lines. As shown in FIG. 5B, in the present embodiment, the sub-pixel array 210 is driven by applying the column-inversion driving method. Therefore, the polarity of each of the data lines D remains unchanged in a frame time. Besides, in view of the above descriptions, the signals inputted to the neighboring data lines D have different polarities. In the following exemplary descriptions, the signal with the positive polarity is inputted into the data line D(2), and the signal with the negative polarity is inputted into the data line D(3), for instance.

With reference to FIGS. 5A and 5B, in the present embodiment, the data driving chip 250 can be located below the sub-pixel array 210. Therefore, when the scan lines G in FIG. 5B are sequentially turned on from top to bottom, the data line D(2) respectively inputs corresponding signals with the positive polarity to sub-pixels $P_{T2}$, $P_{T3}$, $P_{T4}$, and $P_{T5}$ at the second timing T2, the third timing T3, the fourth timing T4, and the fifth timing T5, such that the sub-pixels $P_{T2}$, $P_{T3}$, $P_{T4}$, and $P_{T5}$ respectively display white patterns, black patterns, white patterns, and black patterns. The signal waveform of the data line D(2) is indicated in the right part of FIG. 5B. On the other hand, when the scan lines G in FIG. 5B are sequentially turned on from top to bottom, the data line D(3) respectively inputs corresponding signals with the negative polarity to sub-pixels $P_{T1}$, $P_{T2}$, $P_{T3}$, and $P_{T4}$ at the first timing T1, the second timing T2, the third timing T3, and the fourth timing T4, such that the sub-pixels $P_{T1}$, $P_{T2}$, $P_{T3}$, and $P_{T4}$ respectively display black patterns, white patterns, black patterns, and white patterns. The signal waveform of the data line D(3) is indicated in the right part of FIG. 5B.

The common electrode is coupled by the data lines, and the voltage of the common electrode is varied by coupling effect arisen from variations in data polarity with time sequence. From the signal waveforms of the data lines D(2) and D(3) as shown in FIG. 5B, it can be learned that the voltage coupling effect arisen from the data line D(2) is opposite to the voltage coupling effect arisen from the data line D(3) at any timing, and therefore the total coupling of the common electrode can be eliminated. In detail, according to the present embodiment, the LCD panel further includes a common electrode, and the voltage coupling effect of the neighboring sub-pixels with respect to the common electrode can be neutralized. That is to say, from a microscopic perspective, the signals transmitted through each of the data lines D in the entire LCD panel 200 are inevitably affected by the coupling effects. By contrast, from a macroscopic perspective, when the LCD panel 200 has a proper layout, the voltage coupling effects arisen from different polarity signals transmitted through the neighboring data lines D in any timing can be neutralized, and the total coupling of the common electrode is thus eliminated. Thereby, the common voltage Vcom is not shifted because of the conventional crosstalk effect. As such, mura phenomenon can be prevented, and satisfactory display quality can be achieved.

Figure 6A:
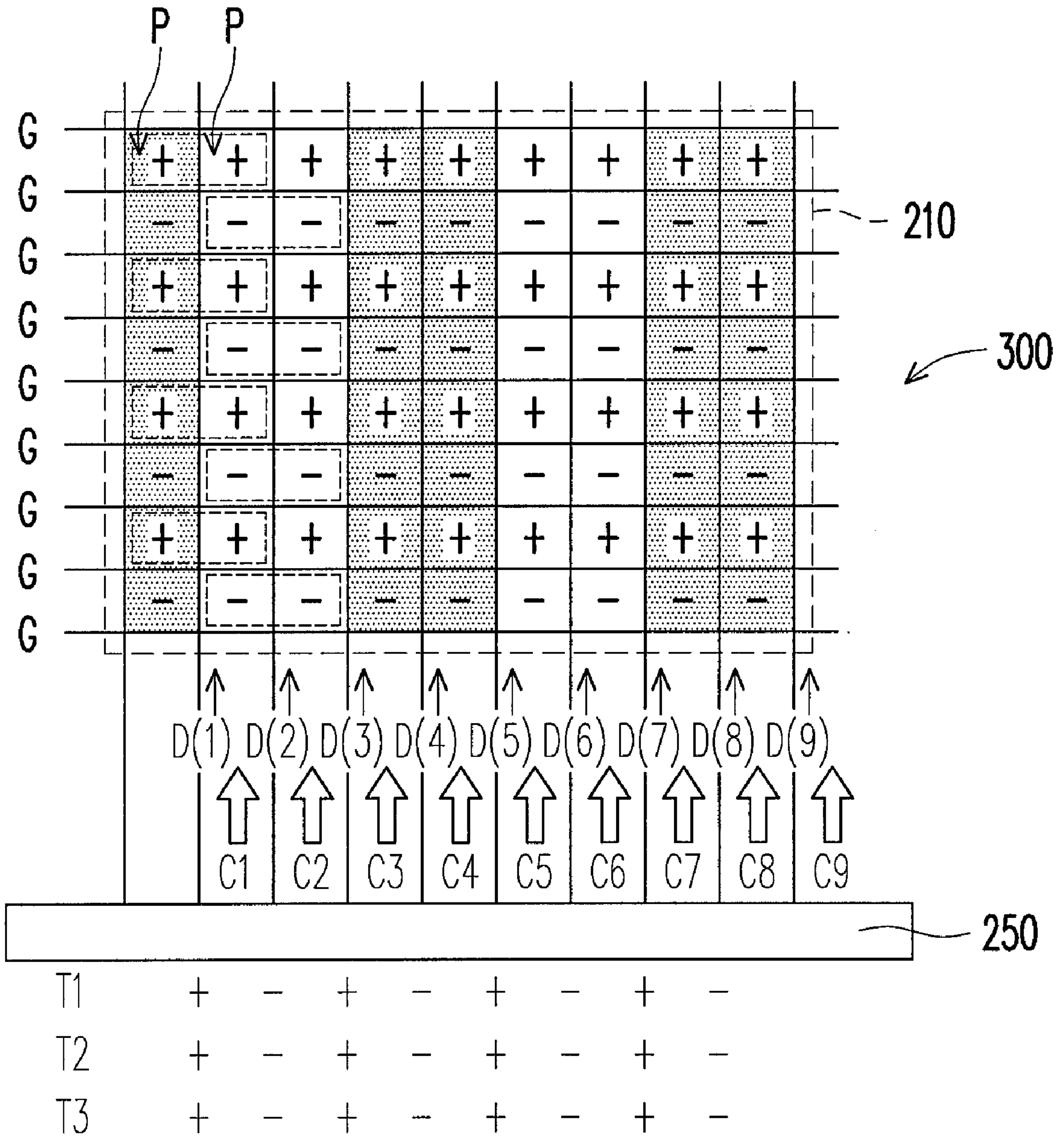
FIG. 6A is a schematic view illustrating a signal state of an LCD panel according to another exemplary embodiment of the present invention, wherein the LCD panel displays alternate black and white patterns through applying a column-inversion driving method.

FIG. 6A is a schematic view illustrating a signal state of an LCD panel according to another exemplary embodiment of the present invention, wherein the LCD panel displays alternate black and white patterns through applying a column-inversion driving method. The LCD panel 300 of the present embodiment is similar to the LCD panel 200 depicted in FIG. 5A, i.e. the two LCD panels 300 and 200 are both used for displaying alternate black and white patterns. Nevertheless, the alternate black and white patterns as shown in FIG. 5A are spaced by each column of the sub-pixels P (patterns are continuously displayed in the order of black, white, black, and white), while the alternate black and white patterns in the present embodiment are spaced by every two columns of the sub-pixels P (patterns are continuously displayed in the order of black, black, white, and white).

Figure 6B:
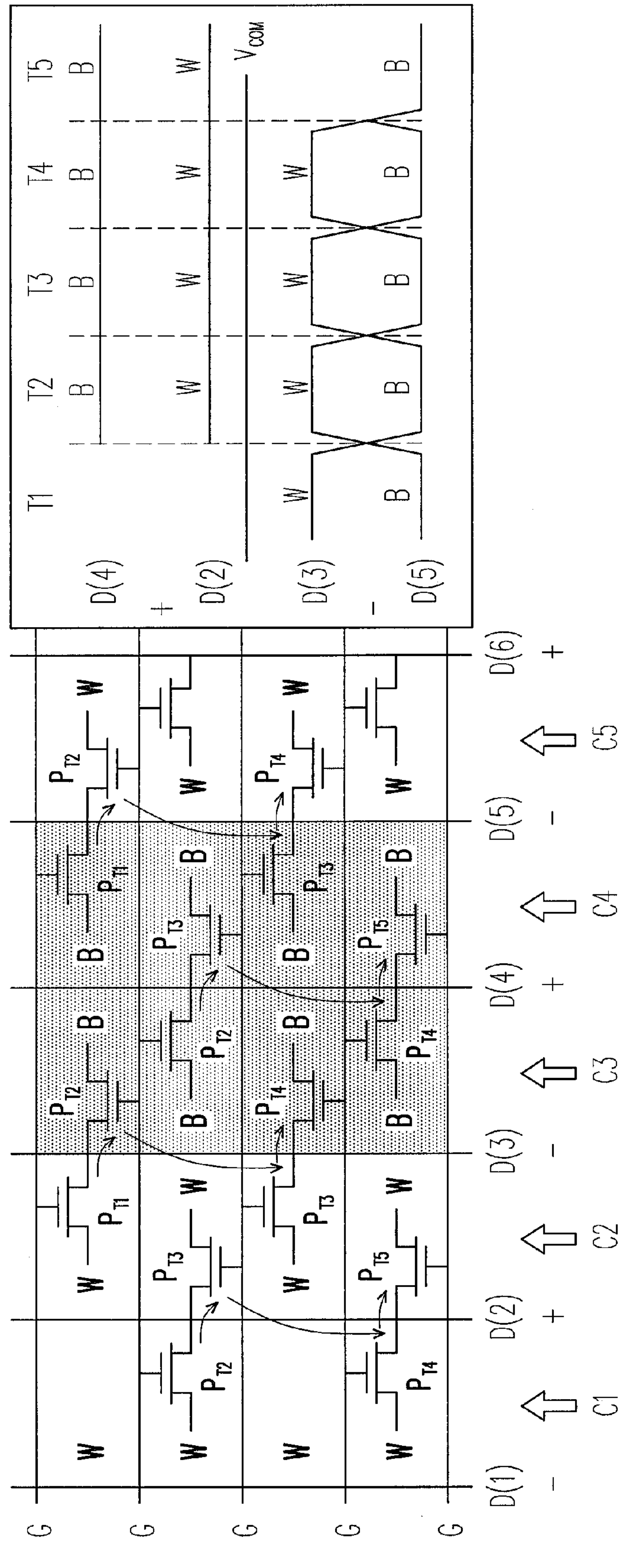
FIG. 6B is a view partially illustrating the signal state depicted in FIG. 6A and schematically illustrating driving waveforms of data lines.

FIG. 6B is a view partially illustrating the signal state depicted in FIG. 6A and schematically illustrating driving waveforms of data lines. As shown in FIG. 6B, in the present embodiment, the sub-pixel array 210 is driven by applying the dot-inversion driving method. Therefore, the polarity of each of the data lines D remains unchanged in a frame time. Besides, in view of the above descriptions, the signals inputted to the neighboring data lines D have different polarities. Moreover, in the present embodiment, the black patterns and the white patterns are respectively represented by the signals with the positive polarity and the signals with the negative polarity. Therefore, the data lines D(2), D(3), D(4), and D(5) are grouped as one set to analyze and explain the signal waveform in the present embodiment.

With reference to FIG. 6A, in the present embodiment, the data driving chip 250 can be located below the sub-pixel array 210. Therefore, when the scan lines G in FIG. 6B are sequentially turned on from top to bottom, the data line D(2) respectively inputs corresponding signals with the positive polarity to sub-pixels $P_{T2}$, $P_{T3}$, $P_{T4}$, and $P_{T5}$ at the second timing T2, the third timing T3, the fourth timing T4, and the fifth timing T5, such that the sub-pixels $P_{T2}$, $P_{T3}$, $P_{T4}$, and $P_{T5}$ respectively display white patterns, white patterns, white patterns, and white patterns. The signal waveform of the data line D(2) is indicated in the right part of FIG. 6B. On the other hand, when the scan lines G in FIG. 6B are sequentially turned on from top to bottom, the data line D(3) respectively inputs corresponding signals with the negative polarity to sub-pixels $P_{T1}$, $P_{T2}$, $P_{T3}$, and $P_{T4}$ at the first timing T1, the second timing T2, the third timing T3, and the fourth timing T4, such that the sub-pixels $P_{T1}$, $P_{T2}$, $P_{T3}$, and $P_{T4}$ respectively display white patterns, black patterns, white patterns, and black patterns. The signal waveform of the data line D(3) is indicated in the right part of FIG. 6B.

Referring to FIG. 6B, when the scan lines G are sequentially turned on from top to bottom, the data line D(4) respectively inputs corresponding signals with the positive polarity to sub-pixels $P_{T2}$, $P_{T3}$, $P_{T4}$, and $P_{T5}$ at the second timing T2, the third timing T3, the fourth timing T4, and the fifth timing T5, such that the sub-pixels $P_{T2}$, $P_{T3}$, $P_{T4}$, and $P_{T5}$ respectively display black patterns, black patterns, black patterns, and black patterns. The signal waveform of the data line D(4) is indicated in the right part of FIG. 6B. On the other hand, when the scan lines G are sequentially turned on from top to bottom, the data line D(5) respectively inputs corresponding signals with the negative polarity to sub-pixels $P_{T1}$, $P_{T2}$, $P_{T3}$, and $P_{T4}$ at the first timing T1, the second timing T2, the third timing T3, and the fourth timing T4, such that the sub-pixels $P_{T1}$, $P_{T2}$, $P_{T3}$, and $P_{T4}$ respectively display black patterns, white patterns, black patterns, and white patterns. The signal waveform of the data line D(5) is indicated in the right part of FIG. 6B.

From the signal waveforms of the data lines D(2), D(3), D(4), and D(5) depicted in FIG. 6B, voltage coupling effects arisen from different polarity signals transmitted through the set of the data lines D(2), D(3), D(4), and D(5) in any timing can be neutralized, such that the total coupling of the common electrode is eliminated. Therefore, from a microscopic perspective, the signals transmitted through each of the data lines D in the entire LCD panel 300 are inevitably affected by the coupling effect. By contrast, from a macroscopic perspective, when the LCD panel 300 has a proper layout, the voltage coupling effects arisen from different polarity signals transmitted through the neighboring data lines D in any timing can be neutralized, and the total coupling of the common electrode is thus eliminated. Thereby, the common voltage Vcom is not shifted because of the conventional crosstalk effect. As such, mura phenomenon in the conventional LCD panel can be minimized, and display quality can be improved. Certainly, through the proper layout, the LCD panel 300 of the present invention can be driven by applying a dot-inversion driving method, and the voltage coupling effects arisen from different polarity signals transmitted through the data lines D can also be neutralized, which should not be construed as a limitation to the present invention.

Figure 7:
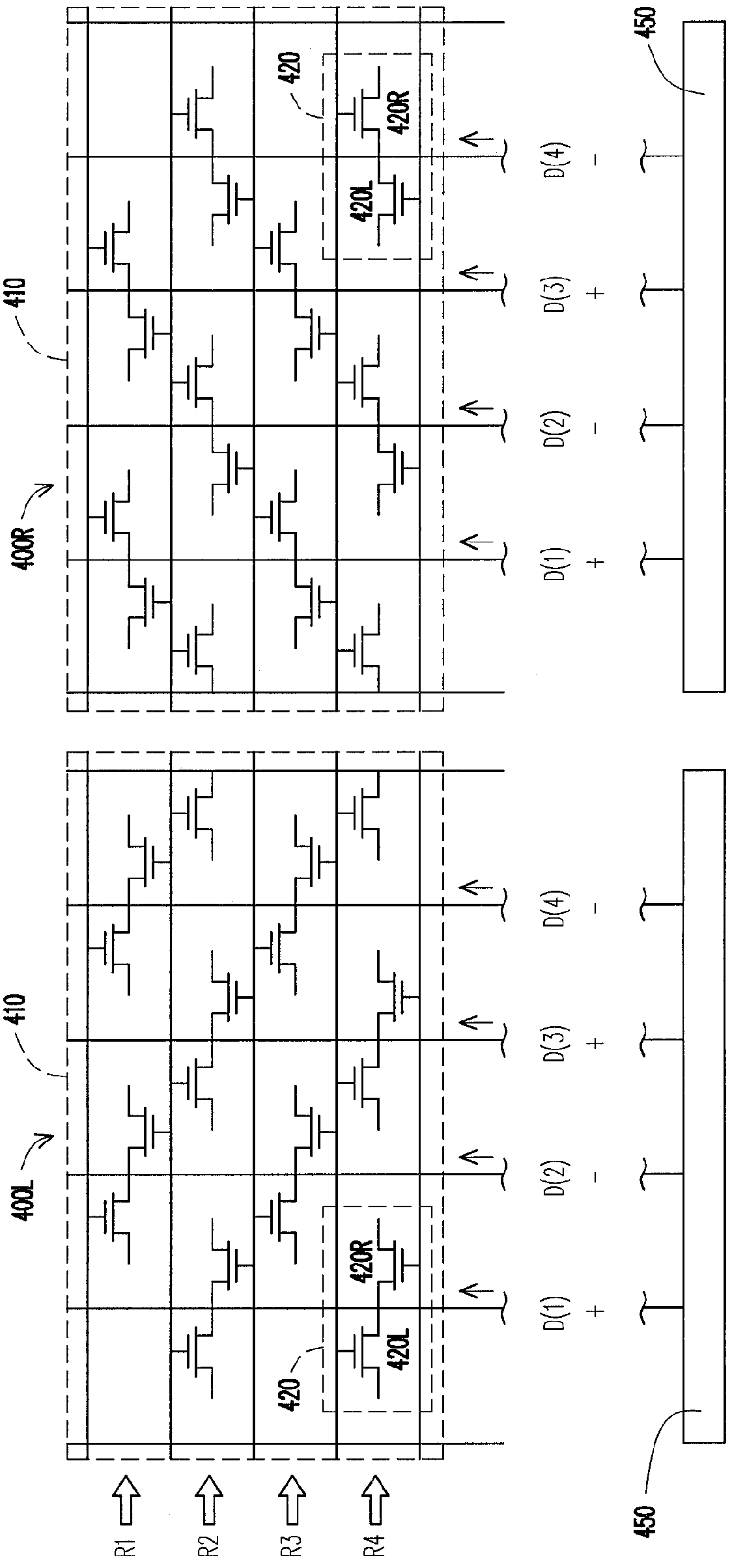
FIG. 7 is a schematic diagram illustrating another LCD panel layout according to an exemplary embodiment of the present invention.

It should be mentioned that an order of charging the sub-pixels P which are connected to the same data line D is not limited in the present invention. FIG. 7 is a schematic diagram illustrating another LCD panel layout according to an exemplary embodiment of the present invention. Referring to FIG. 7, when signals from the data driving chip 450 (as indicated in the lower part of FIG. 7) are transmitted to the sub-pixel array 410, sub-pixels 420L located at the left of the data lines D can be charged earlier than sub-pixels 420 R located at the right of the data lines D, and vice versa. Here, sub-pixels arranged in the same row and connected to the same data line D are considered as one set of sub-pixels 420. For instance, in a set of sub-pixels 410 arranged in row R4 of the left LCD panel 400L, the data-input time of sub-pixels 410L which are located at the left and connected to the data line D(1) is earlier than the data-input time of sub-pixels 410R located at the right and connected to the data line D(1). Certainly, in a set of sub-pixels 420 similarly arranged in row R4 of the right LCD panel 400R, the data-input time of sub-pixels 420L located at the left and connected to the data line D(1) is later than the data-input time of sub-pixels 420R located at the right and connected to the data line D(1). In brief, an order of inputting data signals to the sub-pixels P which are arranged in the same row and connected to the same data line D is not limited in the present invention.

Figure 8A:
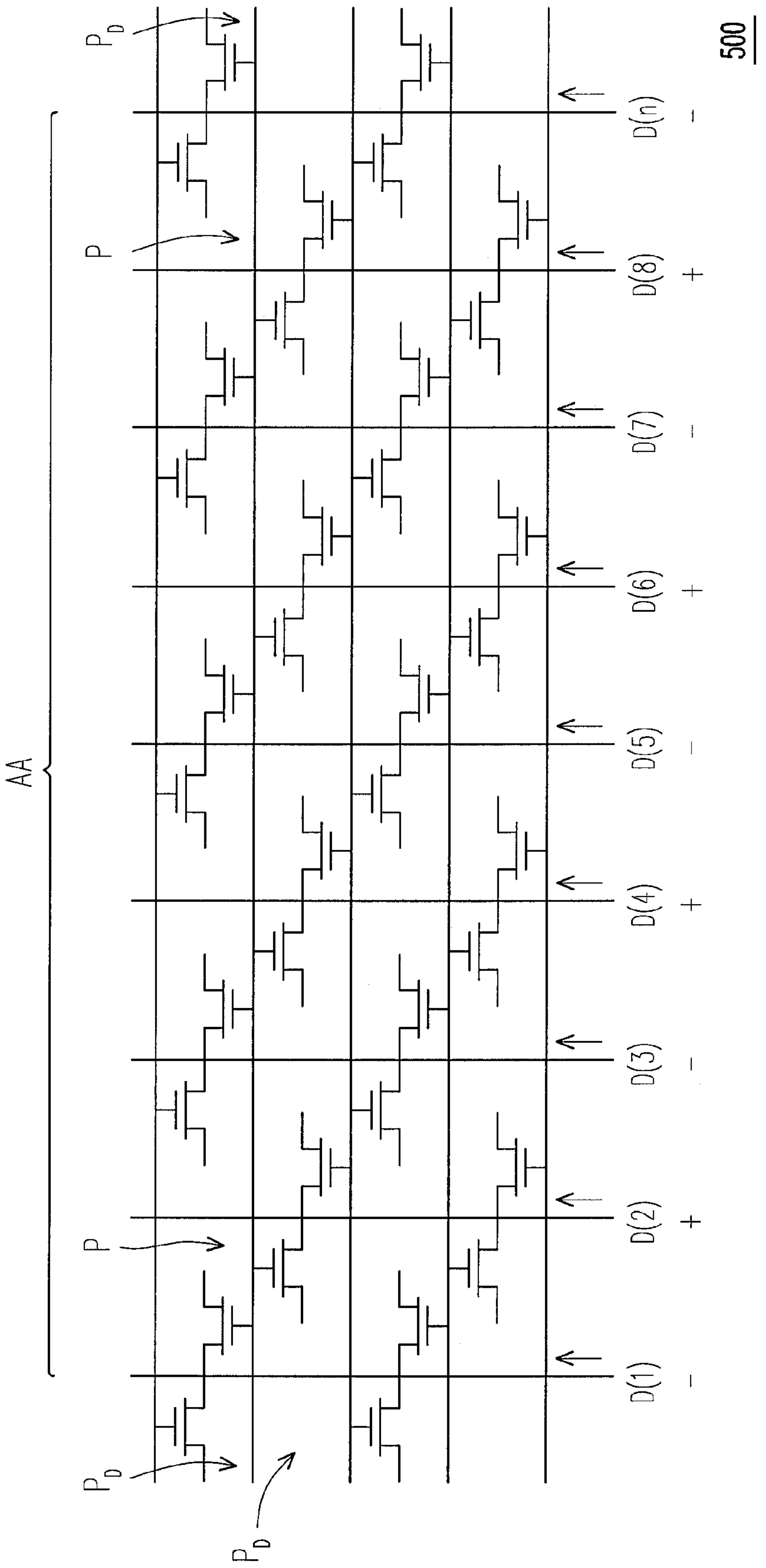
FIG. 8A is a schematic diagram of yet another LCD panel layout according to an exemplary embodiment of the present invention.

FIG. 8A is a schematic diagram of yet another LCD panel layout according to an exemplary embodiment of the present invention. The LCD panel 500 depicted in FIG. 8A is similar to the LCD panel described in the previous embodiment, while the LCD panel 500 of the present embodiment further has a plurality of dummy sub-pixels PD located outside a display region AA. The dummy sub-pixels PD are arranged at two sides of the sub-pixels P and can be electrically connected to the outermost two data lines D. Through disposition of the dummy sub-pixels PD, each of the data lines D in the display region AA can have consistent load, such that the total coupling of the common electrode can be eliminated more efficiently because of the voltage coupling effects arisen from different signals transmitted through a set of data lines D can be neutralized.

Figure 8B:
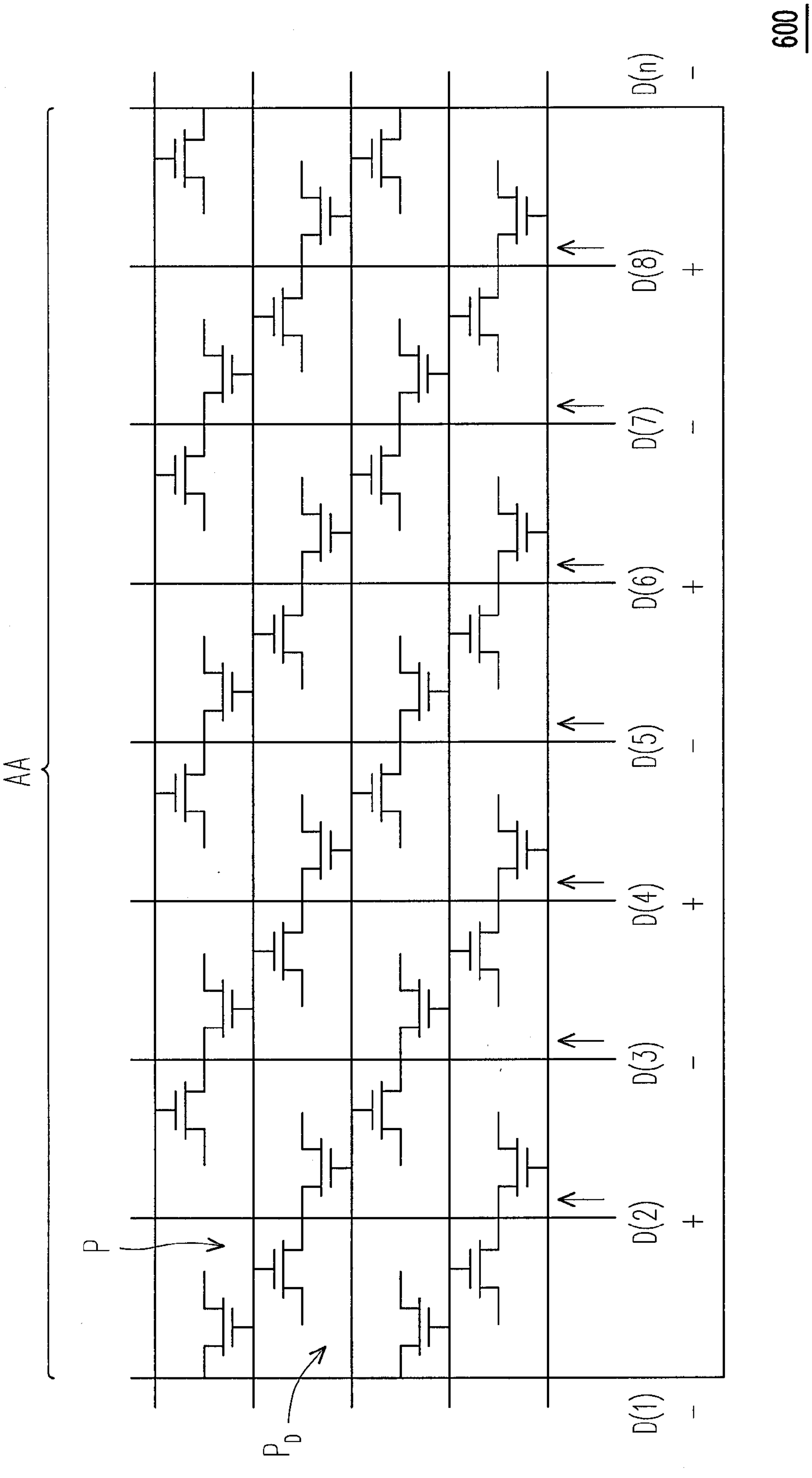
FIG. 8B is a schematic diagram of yet another LCD panel layout according to an exemplary embodiment of the present invention.

FIG. 8B is a schematic diagram of yet another LCD panel layout according to an exemplary embodiment of the present invention. The LCD panel 600 depicted in FIG. 8B is similar to the LCD panel described in the previous embodiment, while the outermost two data lines D in the LCD panel 600 of the present embodiment can be electrically connected to each other. Likewise, the outermost two data lines D and other data lines in the display region AA can substantially have consistent load, such that the total coupling of the common electrode can be eliminated more efficiently because of the voltage coupling effects arisen from different polarity signals transmitted through the neighboring data lines D can be neutralized.

Figure 9:
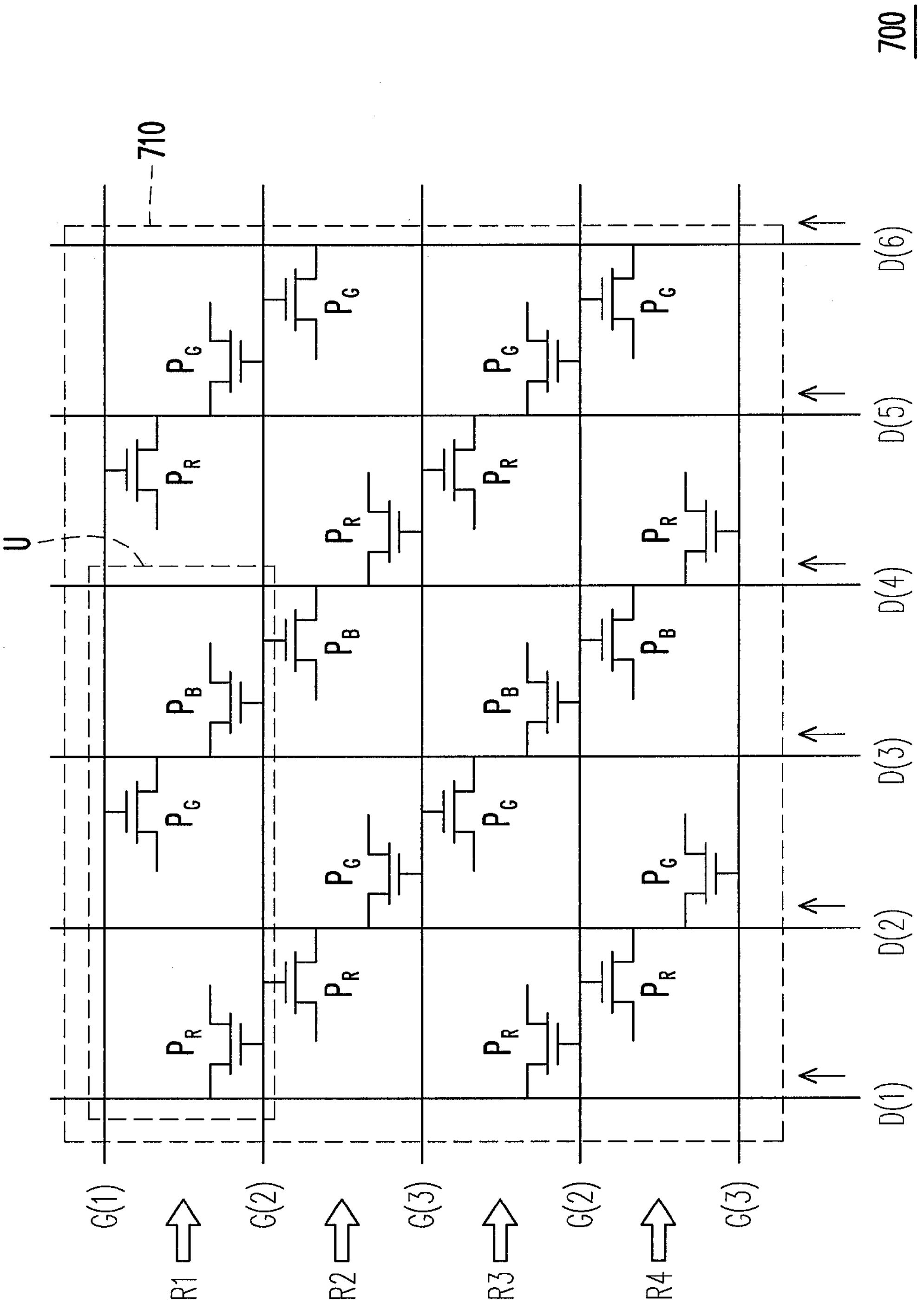
FIG. 9 is a schematic diagram of yet another LCD panel layout according to an exemplary embodiment of the present invention.

FIG. 9 is a schematic diagram of yet another LCD panel layout according to an exemplary embodiment of the present invention. As shown in FIG. 9, a driving structure with a normal pixel arrangement is taken for example. The LCD panel 700 depicted in FIG. 9 includes a sub-pixel array 710, a plurality of scan lines G, and a plurality of data lines D. Components identical to those described above are indicated by the same reference numbers, and therefore no further description is provided herein. The sub-pixel array 710 includes a plurality of sub-pixels P arranged in array, and any two neighboring scan lines G and a row of the sub-pixels P disposed between the two neighboring scan lines G are electrically connected. The sub-pixels P arranged in odd rows are electrically connected to the odd-numbered data lines D, and the sub-pixels P arranged in even rows are electrically connected to the even-numbered data lines D.

More specifically, as shown in FIG. 9, the sub-pixels P include a plurality of first primary color sub-pixels $P_R$ arranged in the same column, a plurality of second primary color sub-pixels $P_G$ arranged in the same column, and a plurality of third primary color sub-pixels $P_B$ arranged in the same column. The first, the second, and the third primary color sub-pixels $P_R$, $P_G$, and $P_B$ in each row are alternately arranged in sequence, for example. Here, the first, the second, and the third primary color sub-pixels $P_R$, $P_G$, and $P_B$ respectively display the red color, the green color, and the blue color, for example. Besides, in the same row of the sub-pixels P, the neighboring first, second, and third primary color sub-pixels $P_R$, $P_G$, and $P_B$ together form a pixel unit U, for example. Additionally, the first primary color sub-pixels $P_R$ of the sub-pixels P can be arranged in a first column, a fourth column, . . . , and a (3m+1)th column; the second primary color sub-pixels $P_G$ of the sub-pixels P can be arranged in a second column, a fifth column, . . . , and a (3m+2)th column; the third primary color sub-pixels $P_B$ of the sub-pixels P can be arranged in a third column, a sixth column, . . . , and a (3m+2)th column. Here, m represents a natural number.

It should be mentioned that through applying the column-inversion driving method or the dot-inversion driving method to the LCD panel 700 of the present embodiment, mura phenomenon of the displayed images caused by the crosstalk effect can be prevented. Namely, in the driving mechanism of the present application, the driving method requires low power consumption but achieves favorable display quality. Since relevant descriptions are provided hereinbefore, no further explanation is provided below. In light of the foregoing, the LCD panel of the present application is capable of reducing the power consumption of the data driving chip, so as to save energy and manufacturing costs. Moreover, through properly arranging the layout of the sub-pixel array, the scan lines, and the data lines, the total coupling of the common electrode can be eliminated because the voltage coupling effects arisen from different polarity signals transmitted through a set of data lines D can be neutralized. By this way, mura phenomenon of the displayed images can be minimized, and the display quality can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display panel, comprising:

a sub-pixel array comprising a plurality of sub-pixels arranged in array;

a plurality of scan lines, wherein any two neighboring scan lines of the scan lines and a row of the sub-pixels disposed between the two neighboring scan lines are electrically connected; and a plurality of data lines, wherein the sub-pixels arranged in odd rows are electrically connected to the data lines which are odd-numbered, and the sub-pixels arranged in even rows are electrically connected to the data lines which are even-numbered.

2. The liquid crystal display panel as claimed in claim 1, wherein each of the sub-pixels comprises:

an active device electrically connected to one of the scan lines and one of the data lines; and a pixel electrode electrically connected to the active device.

3. The liquid crystal display panel as claimed in claim 1, wherein in a same row of the sub-pixels, the sub-pixels arranged in even columns are connected to one of the scan lines, and the sub-pixels arranged in odd columns are connected to another one of the scan lines.

4. The liquid crystal display panel as claimed in claim 1, wherein two neighboring sub-pixels of the sub-pixels in a same row are together connected to one of the data lines.

5. The liquid crystal display panel as claimed in claim 1, wherein the sub-pixels comprise a plurality of first primary color sub-pixels arranged in a same row, a plurality of second primary color sub-pixels arranged in a same row, and a plurality of third primary color sub-pixels arranged in a same row, and the first, the second, and the third primary color sub-pixels in each column are alternately arranged in sequence.

6. The liquid crystal display panel as claimed in claim 5, wherein in a same column of the sub-pixels, the neighboring first, second, and third primary color sub-pixels together form a pixel unit.

7. The liquid crystal display panel as claimed in claim 1, wherein the sub-pixels comprise a plurality of first primary color sub-pixels arranged in a same column, a plurality of second primary color sub-pixels arranged in a same column, and a plurality of third primary color sub-pixels arranged in a same column, and the first, the second, and the third primary color sub-pixels in each row are alternately arranged in sequence.

8. The liquid crystal display panel as claimed in claim 7, wherein in a same row of the sub-pixels, the neighboring first, second, and third primary color sub-pixels together form a pixel unit.

9. The liquid crystal display panel as claimed in claim 7, wherein the first primary color sub-pixels of the sub-pixels are arranged in a first column, a fourth column, . . . , and a (3m+1)th column, the second primary color sub-pixels of thesub-pixels are arranged in a second column, a fifth column, . . . , and a (3m+2)th column, the third primary color sub-pixels of the sub-pixels are arranged in a third column, a sixth column, . . . , and a (3m+2)th column, and in represents a natural number.

10. The liquid crystal display panel as claimed in claim 1, further comprising a plurality of dummy sub-pixels disposed at two sides of the sub-pixels and electrically connected to the outermost two data lines.

11. The liquid crystal display panel as claimed in claim 1, wherein the outermost two data lines are electrically connected to each other.

12. The liquid crystal display panel as claimed in claim 1, further comprising a common electrode, wherein polarities of the neighboring sub-pixels with respect to the common electrode are opposite.

13. A driving method for driving the liquid crystal display panel as claimed in claim 1, the driving method comprising:

inputting a signal with a first polarity to the odd-numbered data lines and inputting a signal with a second polarity to the even-numbered data lines.

14. The driving method as claimed in claim 13, wherein a signal with a positive polarity is inputted to the odd-numbered data lines, and a signal with a negative polarity is inputted to the even-numbered data lines, so as to drive the sub-pixel array through applying a column-inversion driving method.

15. The driving method as claimed in claim 13, wherein a signal with a first inverted polarity is inputted to the odd-numbered data lines, and a signal with a second inverted polarity opposite to the first inverted polarity is inputted to the even-numbered data lines, so as to drive the sub-pixel array through applying a dot-inversion driving method.

16. A liquid crystal display panel, comprising:

a sub-pixel array comprising a plurality of sub-pixels arranged in array;

a plurality of scan lines, wherein any two neighboring scan lines of the scan lines and a row of the sub-pixels disposed between the two neighboring scan lines are electrically connected; and a plurality of data lines divided into a first group and a second group, each of the data lines of the first group and each of the data lines of the second group being alternately arranged, wherein the sub-pixels arranged in odd columns rows are electrically connected to the data lines of the first group, and the sub-pixels arranged in even columns rows are electrically connected to the data lines of the second group.

17. The liquid crystal display panel as claimed in claim 16, wherein the data lines of the first group comprise the data lines which are odd-numbered, and the data lines of the second group comprise the data lines which are even-numbered.

18. The liquid crystal display panel as claimed in claim 16, wherein the data lines of the first group comprise the data lines which are even-numbered, and the data lines of the second group comprise the data lines which are odd-numbered.

* * * * *